United States Patent Office 2,873,200
Patented Feb. 10, 1959

2,873,200
RESINOUS COATING COMPOSITIONS AND PROCESS OF MAKING THEM

Sylvan O. Greenlee, Racine, Wis., assignor to
S. C. Johnson & Son, Inc., Racine, Wis.

No Drawing. Application October 13, 1954
Serial No. 462,118

5 Claims. (Cl. 106—218)

This invention relates to coating compositions and particularly to paint or varnish compositions containing one or more film-forming resins in solution in a common solvent or combination of solvents together with certain synthetic wax-like esters.

The beneficial results attainable by the addition of natural and synthetic waxes to protective coatings have been well established. Such components are well known for their ability to render a paint or varnish composition resistant to marring, abrasion, dirt, and mildew, and repellent to water.

Whereas natural waxes, including those of animal origin such as beeswax; vegetable waxes such a carnauba and ouricuri; and mineral waxes, especially the paraffins, have been employed as the wax components in protective coating compositions and have successfully imparted the desired characteristics to the films, nevertheless these additives also impart certain undesirable physical properties. These materials have very limited solubility in varnishes and when incorporated even in very small amounts, destroy adhesion and inhibit film curing. Even with the incorporation of an efficacious drying agent, a paint containing one of the above waxes as a component produces a film requiring prolonged drying periods, often exceeding 72 hours.

Synthetic waxes such as that described in U. S. Patent No. 2,653,910 have been prepared in an attempt to minimize the above limitations. Whereas common solvents for both the resin and synthetic wax have been discovered for use in either varnish or paint compositions, nevertheless upon evaporation of the solvent, the colloidally dispersed materials, being incompatible, tend to constrict, causing a haze or cloud to form in the film.

In accordance with this invention, it has been found that certain synthetic waxes which impart water repellency and mar and abrasion resistance to a protective coating composition are completely compatible with the resinous constituent of such compositions, thereby precluding any molecular constriction or haziness in the dried film. This invention therefore relates to protective coating compositions comprising a resin, a thinner and a small amount of a diester prepared from a dihydric phenol and a saturated monobasic acid containing from 16 to about 30 carbon atoms.

Resins suitable for use in the paint and varnish compositions of this invention, hereinafter referred to as coating resins, include the natural varnish resins, such as rosin or rosin esters; phenolic resins, which are usually products derived from the reaction of formaldehyde with para-alkyl substituted phenols; formaldehyde and melamine formaldehyde resins, especially where the paint product is to be converted by the application of heat; polystyrene resins such as styrene-modified materials which may be copolymerized with unsaturated alkyd resins and drying oils; and materials such as polymethacrylic, coumarone and sulfonamide resins, chlorinated, epichlorhydrin-bisphenol condensation resins, etc. As is well known, the hard resins are preferably plasticized with, for example, drying oils or the like.

The amount of the synthetic wax of this invention suitable for use in protective coating compositions ranges from 0.5 to about 10%, based on the resin. Certain proportions may be more desirable, depending on the type of coating, the particular wax, and the end results desired. It has been found that the incorporation of from 0.5 to 5% of the subject synthetic waxes in oleoresinous, alkyd, and epoxy resin ester varnishes gives compositions producing dried films which are very water repellent, mar and abrasion resistant. Varnishes used as vehicles in pigmented paint products may in some cases advantageously contain even more than 5% wax, as high as 10%, based on the resin content. Amounts greater than about 10% have been found to impart no appreciable improvement to the coating compositions and adversely affect some types, causing a weakening of the film strength. Unlike natural waxes, the subject synthetic waxes are very soluble in varnish constituents, and when used in proper proportions do not inhibit the curing of films by either air-drying or baking methods. Such cured films adhere well and form good surfaces for recoating in that paints and varnishes applied over them show good surface adhesion.

The saturated esters of this invention may be polynuclear products such as the diester of p,p′-isopropylidenediphenol

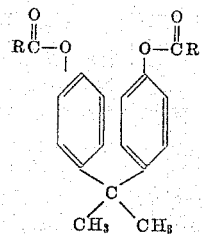

or mononuclear such as the diester of resorcinol

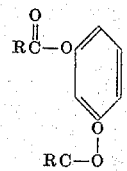

wherein R represents a saturated alkyl chain of from 15 to 29 carbon atoms.

These diesters are prepared by esterification of the dihydroxy phenols with the corresponding saturated acids containing from 16 to 30 carbon atoms. This esterification may be conveniently carried out by using the corresponding acid chlorides or by heating a mixture of the dihydroxy phenol with the long chain acid in the presence of acetic anhydride, finally raising the reaction temperature to a point above that of the boiling point of acetic acid. Typical acids which may be used are palmitic, stearic, arachidic ($C_{20}$), behenic ($C_{22}$), lignoceric ($C_{24}$), and carnauba wax acids. Dihydroxy phenols which may be used include both mono- and polynuclear products as illustrated by resorcinol, hydroquinone, dihydroxynaphthalenes, and bisphenols obtained by the condensation of ketones and certain aldehydes with monohydric phenols such as phenol. The dihydroxy phenols used may be nuclear halogenated with either bromine or chlorine.

The bisphenols as described in this specifications are prepared by the condensation of monohydroxy phenols with ketones and aldehydes contain an alkyl group joining the two benzene rings, and it has been found that those products in which the alkyl group contains from 1 to 10 carbon atoms are conveniently used in preparing the synthetic waxes herein described. Methylidenediphenol is, for example, available from the reaction of phenol with formaldehyde in cases where the formaldehyde is controllably released from such compositions as methylol ureas.

The waxy diesters of this invention may be prepared by heating the dihydroxy phenol for a period of 3 to 4 hours at 140 to 150° C. with an equivalent amount of the acid chloride. Alternatively, the dihydroxy phenol may be heated with at least an equivalent amount of acetic anhydride and with an equivalent amount of the long chain acid. The temperature should be held for about an hour at 125 to 140° C. following which it should be raised to about 250° C. and maintained at this level until all of the acetic anhydride and acetic acid have been removed by distillation. Irrespective of which process is employed, the unreacted long chain acids, if present in undesirable amounts, may be removed from the diester by washing a hydrocarbon solution of the product with aqueous sodium carbonate.

The following are illustrative of the waxy diesters employed in the composition of this invention:

| | Acid No. | Sap. No. | M. P., °C. |
|---|---|---|---|
| 1. p,p'-Isopropylidenediphenol Distearate | 0.7 | 145.4 | 44.2 |
| 2. p,p'-Isopropylidenediphenol Diester of Hydrogenated Rape Seed Oil.[1] | 9.2 | 137.7 | 50.9 |
| 3. Resorcinol Distearate | 7.5 | 191.6 | 53.3 |
| 4. Rape Seed Oil Acid Esters of Resorcinol [2] | 3.6 | 170.2 | 62.3 |
| 5. Distearate of Dichlorinated p,p'-Isopropylidenediphenol. | 9.1 | | 67.6 |
| 6. Hexachlorinated p,p'-Isopropylidenediphenol Distearate. | 9.8 | 213 | 70 |

[1] The hydrogenated rape seed oil acids used had an acid number of 180 (corresponding to an average molecular weight of 313, indicating an average chain length of around 20 carbon atoms).

[2] 47.5% soluble in heptane at 10% solids and 21° C., the remaining diesters being completely soluble under the same conditions.

The acid number as used herein is defined as the number of milligrams of potassium hydroxide which is equivalent to the acid content of 1 gram of the sample.

Saponification number as used herein is defined as the quantity in milligrams of potassium hydroxide necessary to saponify 1 gram of the sample.

Melting points as used herein were run by the following procedure:

Place 30 to 50 grams of the waxy material in a small porcelain crucible and allow all of the material to melt in an oven at 100–105° C. Allow the material to remain in the oven for 15 minutes after melting is complete. Remove the material from the oven and immediately dip the entire bulb of a thermometer, having a range from 0 to 250° C. and bulb dimensions of 18 millimeters' length and 6 millimeters' diameter in the molten material. Promptly withdraw the thermometer and allow the material to solidify on the bulb at room temperature. Repeat dipping and cooling procedure until a coating of ⅛" thickness has been deposited on the thermometer bulb. Allow the coated thermometer bulb to stand at room temperature for one-half hour. Place the thermometer in a Schroeder softening point apparatus equipped with a slotted cork for holding the thermometer. [Dimensions of inner air chamber of apparatus—length, 125 millimeters; diameter, 18 to 20 millimeters—as described in the Mitchell Rand Mfg. Company publication, "Columbia Method," No. 226, p. 19, 1920] using concentrated sulfuric acid or diethylene glycol as the heat transfer medium and positioning the thermometer so that the coated bulb is firmly held midway between the upper and lower angles of the elbow of the apparatus. The elbow of the heating tube is heated with a Bunsen flame so that the rate of temperature increase is 1° C. per minute. Note and report temperature at which the coating slides down uncovering one-half of the bulb. This mid point is considered the melting point.

Illustrative examples of the improved coating compositions of this invention are as follows:

Example I

A basic varnish formula was prepared in which 42 g. of 100% phenolic resin, 124 g. of rosin modified phenolic resin and 100 g. of white refined linseed oil were weighed into a suitable processing kettle and the mixture heated to 560° F. and held at that temperature until a cold drop on a glass plate was clear (about 10 minutes). To this cook was added 300 g. of China-wood oil and the temperature adjusted to 450° F. and held until the desired viscosity was obtained (A–A2 on Gardner-Holdt bubble viscosimeter at 40.0% ±1% non-volatile content as subsequently thinned). Solvents and thinners consisting of 114 g. of dipentine, 690 g. of mineral spirits were incorporated and the mixture cooled, after which 7.9 g. of 24% lead naphthenate, 1.1 g. of 6% manganese naphthenate, 2.2 g. of 6% cobalt naphthenate and 1.95 g. of 8% zinc naphthenate were added.

The following table represents additions of waxes to this basic varnish and the results obtained. The waxes were added by warming in an approximately equal portion of mineral spirits until the waxes were dissolved, followed by immediate addition to the varnish which was stirred to effect complete blending of the wax solution.

| Wax | Percent Wax on Non-Volatile | Condition of Liquid Varnish and Dry Film Produced | Water Repellency |
|---|---|---|---|
| Basic varnish | 0 | Varnish dries rapidly to clear film. | None. |
| Resorcinol distearate | 2 | Wax compatible; varnish dried rapidly to clear film. | Good. |
| Resorcinol diester of rape seed acids. | 1 | ___do___ | Fair. |
| Do | 2 | ___do___ | Good. |
| Bisphenol ester of hydrogenated rape acids. | 2 | ___do___ | Do. |

With regard to interpretation of water repellency, a contact angle of 72° is considered to lack water repellency, whereas a contact angle of 99° is considered very good. A minimum concentration required by these waxes to give water repellency and mar resistance can be considered to be 0.5% based on the non-volatile content.

Example II

A basic gloss enamel was prepared by grinding 2.8 lbs. of rutile titanium dioxide, 1.68 lbs. of a 60% non-volatile alkyd resin solution (pentaerythritol-phthalic anhydride, 50% soya oil modified), 5.5 g. soya lecithin and 0.60 lb. of mineral spirits in a laboratory peddle mill for 24 hours to a fineness of grind of 7 as measured on the Hegman fineness gauge. To this paste after grinding was added 2.95 lbs. additional alkyd resin solution, 7.1 g. soya-lecithin, 6.32 g. 6% cobalt naphthenate, 21 g. 24% lead naphthenate, 25.2 g. 5% calcium naphthenate, 4 g. of a volatile anti-skinning agent and .732 lb. mineral spirits, resulting in a final viscosity of 72 Krebs units.

To this basic enamel was added a series of waxes in amounts of 0.5% and 1.0% with results as shown in the accompanying table. Again a minimum wax concentration of 0.5% based on non-volatile vehicle should be considered operable to give demonstrable water repellency and mar resistance.

| Wax | Percent Wax | 60° Specular Gloss of Dried Film | | Water Repellency of Film | |
|---|---|---|---|---|---|
| | | 1 day | 22 days | 1 day | 22 days |
| Basic enamel | 0 | 91 | 87 | None | None. |
| Resorcinol distearate | 0.5 | 91 | 84 | Fair | Fair. |
| | 1.0 | 93 | [1] 87 | Good− | Do. |
| Resorcinol diester of hydrogenated rape acids. | 0.5 | 90 | 86 | Fair+ | Fair+. |
| | 1.0 | 93 | [1] 89 | Good− | Very Good+. |
| Bisphenol distearate | 0.5 | 91 | 86 | Fair+ | Fair. |
| | 1.0 | 93 | [1] 88 | Good− | Do. |
| Bisphenol ester of hydrogenated rape acids. | 0.5 | 90 | 86 | ___do___ | Good−. |
| | 1.0 | 93 | [1] 86 | Very Good | Very Good. |

[1] These values are for 17 days rather than 22.

Example III

A basic semi-gloss enamel is prepared by grinding together in a pebble mill 239 lbs. rutile titanium calcium pigment, 239 lbs. rutile titanium dioxide, 17.4 lbs. zinc oxide, 4.4 lbs. Nuact Paste (a "feeder" drier composed of lead and rare earth naphthenates which prolongs the drying ability of a paint by selectively adsorbing on pigments, thereby preventing pigments from adsorbing active driers described in "Ye Towne Drier," vol. 4, No. 20, April 1951—Nuodex Products Co., Elizabeth, N. J.), 3.5 lbs. aluminum stearate, 261 lbs. of a 55% alkyd resin solution (same type used in gloss enamel), 8.7 lbs. bodied linseed oil and 42 lbs. of mineral spirits. To this after grinding is added 144 lbs. additional alkyd resin solution, 1.87 lbs. 6% cobalt naphthenate, 4.8 lbs. 24% lead naphthenate, 0.65 lbs. of volatile anti-skinning agent and 140 lbs. mineral spirits.

| Wax | Amount Necessary to Give Very Good [1] Water Repellency Based on Non-Volatile Vehicle, percent |
| --- | --- |
| Resorcinol distearate | 3.0 |
| Resorcinol diester of hydrogenated rape acids | 3.0 |
| Bisphenol distearate | 3.0 |
| Bisphenol ester of hydrogenated rape acids | 1.5 |
| Chlorinated bisphenol distearates | 3.0 |

[1] The minimum amount of wax necessary to give demonstrable water repellency and mar resistance is about 0.5% based on non-volatile vehicle.

A one-coat flat paint is prepared in the following manner:

Example IV 476 lbs. of rutile titanium calcium pigment, 86 lbs. rutile titanium dioxide, 96 lbs. calcium carbonate, 64.2 lbs. magnesium silicate and 4.0 lbs. aluminum stearate are ground in a roller or pebble mill with 1.2 lbs. Nuact Paste (an anti-drier adsorption agent), 14.55 lbs. above mentioned wax examples, 234 lbs. of a 50% non-volatile content one-coat flat type alkyd resin solution (pentaerythritol-phthalic anhydride soya acids) and 20 lbs. mineral spirits. This is thinned with 22.4 lbs. of gloss oil, 1.0 lbs. 6% cobalt naphthenate, 2.39 lbs. 24% lead naphthenate, 0.36 lbs. of volatile anti-skinning agent, 7.0 lbs. of a proprietary puffing agent (Advance Solvents Co. Puffing Agent) and 196 lbs. mineral spirits.

A wax fortified one-coat flat paint is best made by grinding the wax into the paint in the pebble mill, although it can be incorporated by the same means as heretofore mentioned. It has been found that from 7.5–10.0% of a very effective water repellent-inducing wax is required to give a good one-coat flat, which will have the necessary advantages due to wax fortification. 10% bisphenol diester of hydrogenated rape acids based on non-volatile vehicle gives good water repellency in high pigment content flat paints.

The chief contribution of the waxes of this invention to a house paint film is that of durability. Formulations in which 3–10% are used offer improvement in mildew resistance and whiteness retention on prolonged exterior exposure (4 years on a test fence using north and south exposure on vertical western red cedar siding).

A typical oil base house paint was used in these tests such as cited in the examples below. The improvement in the aforementioned phases of durability is noted when 3–10% of the oil in the paint is replaced with the wax. The use also of aluminum soaps, such as aluminum naphthenate and aluminum octoate, in amounts of 2–8% substitution of oil also aid the waxes in providing this improved durability.

Example V

.60 lb. of titanium dioxide, .78 lb. of zinc oxide, .5 lb. magnesium silicate are ground together in .86 lb. of wax fortified oil vehicle in a laboratory pebble mill after which .28 lb. additional wax fortified oil vehicle, 14.45 g. of 24% lead naphthenate, 1.92 g. 6% manganese naphthenate, .360 lb. mineral spirits and 3.0 g. of Syntex RL–80, a bodying agent which is a heat bodied castor oil used for bodying alkyd type paint systems (made by Jones-Dabney Co. and described in "Syntex Products" of August 1, 1953, at page 46) are added. The wax fortified oil vehicle is made by heating .038 lb. dichlorobisphenol distearate with 1.23 lbs. of processed linseed oil (Archer-Daniels-Midland 1263–60 oil) until the wax is in solution and then cooling to room temperature.

Example VI

.60 lb. of titanium dioxide, .78 lb. zinc oxide, .5 lb. magnesium silicate and .9 lb. of fortified oil are ground together in a laboratory pebble mill after which .236 lbs. additional fortified oil, 13.3 g. 24% lead naphthenate, 1.75 g. 6% manganese naphthenate, 8.86 g. pine oil, .37 lb. mineral spirits and 1 g. bodying agent (Syntex RL–80) are added. The fortified oil is made by heating together .071 lb. aluminum naphthenate and .071 lb. of processed or heat bodied linseed oil (ADM 1263–60) to 450° F. and holding at that temperature with agitation until the aluminum naphthenate is all dissolved. This mixture is in turn added to .979 lb. of oil which also is preheated to 450° F. This is cooled to 170° F. and .059 lb. hexachlorobisphenol distearate added and the mixture stirrred and cooled to room temperature.

Example VII

.60 lb. of titanium dioxide, .78 lb. zinc oxide, .5 lb. magnesium silicate and .9 lb. of fortified oil are ground together in a laboratory pebble mill, after which .255 lb. additional fortified oil, 10.9 g. 24% lead naphthenate, 1.43 g. 6% manganese naphthenate and .283 lb. of mineral spirits are added, and 2.5 g. bodying agent (Syntex RL–80). The fortified oil in this case is made by heating 1.12 lbs. processed or heat bodied linseed oil (ADM 1263–60), .06 lb. dichlorobisphenol distearate and 10.16 g. aluminum octoate to 160° F. and holding until complete solution is obtained, after which the mixture is cooled to room temperature.

Example VIII

.60 lb. titanium dioxide, .78 lb. zinc oxide, .5 lb. magnesium silicate and .93 lb. of wax fortified oil are ground together in a laboratory pebble mill, after which .24 lb. additional wax fortified oil, 15 g. 24% lead naphthenate, 1.99 g. 6% manganese naphthenate, .28 lb. mineral spirits, 2.5 g. bodying agent (Syntex RL–80) are added. The wax fortified is made by heating 1.10 lbs. processed linseed oil (ADM 1263–60) and .122 lb. hexachlorobisphenol distearate to 160° F. until dissolved and the mixture cooled to room temperature.

It should be appreciated that the compositions hereinbefore described are in no way intended to be limited as to their common constituents since the latter are well known in the art with the exception of the novel use of the waxy diesters and their quantity relationship to the compositions. Likewise, the method the manufacturer has disclosed in the examples is not intended to be limiting since it will be readily appreciated that the resulting compositions may be produced by other well known methods.

Further, although there are disclosed but a limited number of embodiments of the product of the invention herein presented, additional embodiments may be produced without departing from the inventive concept herein taught. Accordingly, it is desired that only such limitations be imposed on the appended claims as are stated therein, or required by the prior art.

I claim:

1. A coating composition comprising paint and varnish resins dissolved in an organic solvent therefor, characterized by improved water repellency and mar and abrasion resistance and having dissolved therein 0.5 to about 10% by weight, based on the coating resin content, of a synthetic wax compatible with said resin, said synthetic wax being a diester of a dihydroxy phenol having no more than two aromatic nuclei and only the elements carbon, hydrogen, oxygen, and halogen and a straight chain saturated aliphatic monocarboxylic acid of 16 to 30 carbon atoms.

2. The composition of claim 1 wherein the diester is a diester of a p,p' dihydroxyphenol alkylidene and a straight chain saturated aliphatic monobasic acid of 16 to 30 carbon atoms.

3. The composition of claim 2 wherein at least one of the phenyl rings of the diester is halogenated.

4. The composition of claim 2 wherein the monobasic acid of the diester is stearic acid.

5. The method of improving the water repellency and mar and abrasion resistance of a coating composition comprising paint and varnish resins dissolved in an organic solvent therefor, consisting of adding to said composition 0.5 to about 10% by weight, based on the coating resin content of the composition, of a synthetic wax compatible with said resin, said synthetic wax being a diester of a dihydroxy phenol having no more than two aromatic nuclei and only the elements carbon, hydrogen, oxygen and halogen and a straight chain saturated aliphatic monobasic acid of 16 to 30 carbon atoms.

References Cited in the file of this patent

UNITED STATES PATENTS

| | | |
|---|---|---|
| 2,134,388 | Cherry | Oct. 25, 1938 |
| 2,345,006 | Ross et al. | Mar. 28, 1944 |
| 2,456,408 | Greenlee | Dec. 14, 1948 |
| 2,563,485 | Pollack | Aug. 7, 1951 |